United States Patent
Chen

(10) Patent No.: US 12,550,210 B2
(45) Date of Patent: Feb. 10, 2026

(54) SYSTEM AND METHOD OF WIRELESS COMMUNICATION IDENTIFICATION AND BATTERY WIRELESS MANAGEMENT SYSTEM THEREOF

(71) Applicant: Grace Connection Microelectronics Limited, Zhubei (TW)

(72) Inventor: Pei Wei Chen, Zhubei (TW)

(73) Assignee: GRACE CONNECTION MICROELECTRONICS LIMITED, Zhubei (TW)

( * ) Notice: Subject to any disclaimer, the term of this patent is extended or adjusted under 35 U.S.C. 154(b) by 322 days.

(21) Appl. No.: 18/511,981

(22) Filed: Nov. 16, 2023

(65) Prior Publication Data
US 2024/0244684 A1 Jul. 18, 2024

(30) Foreign Application Priority Data
Jan. 13, 2023 (TW) .............................. 112101644

(51) Int. Cl.
*H04W 76/10* (2018.01)
*H04B 17/336* (2015.01)
*H04W 76/14* (2018.01)

(52) U.S. Cl.
CPC .......... *H04W 76/14* (2018.02); *H04B 17/336* (2015.01)

(58) Field of Classification Search
CPC ........................ G01R 31/396; G01R 31/3842; G01R 31/389; H02J 7/00; H02J 13/00; H01M 10/48; H04W 76/14; H04W 48/16; H04W 48/04; H04W 76/10; H04B 17/336; H04B 17/318
See application file for complete search history.

(56) References Cited

U.S. PATENT DOCUMENTS

| | | | |
|---|---|---|---|
| 6,735,704 B1 * | 5/2004 | Butka | H02J 3/38 |
| | | | 713/340 |
| 11,601,792 B1 * | 3/2023 | Kerai | H04W 4/80 |
| 2004/0085981 A1 * | 5/2004 | Lee | H04W 28/14 |
| | | | 370/412 |
| 2016/0227351 A1 * | 8/2016 | Gu | H04B 1/44 |
| 2019/0289692 A1 * | 9/2019 | Morita | H05B 47/19 |
| 2020/0100283 A1 * | 3/2020 | Naguib | G01S 11/06 |
| 2020/0200828 A1 * | 6/2020 | Sung | H04B 17/318 |

(Continued)

*Primary Examiner* — Cindy Trandai
(74) *Attorney, Agent, or Firm* — Anna Tsang

(57) ABSTRACT

The invention provides a wireless communication identification system, including: a master wireless communication unit, sending a first wireless signal, and progressively limiting a count of remaining wireless communication units responding to the first wireless signal in the wireless communication identification system according to a signal level adjustment scenario; and a first wireless communication unit, being the last wireless communication unit in the remaining wireless communication units to respond to the first wireless signal under the signal level adjustment scenario; wherein a first wireless signal connection is established between the master wireless communication unit and the first wireless communication unit by the first wireless signal, and the wireless communication identification system transmits first unit identity information of the first wireless communication unit through the first wireless signal connection.

20 Claims, 12 Drawing Sheets

(56) References Cited

U.S. PATENT DOCUMENTS

| | | | |
|---|---|---|---|
| 2022/0300444 A1* | 9/2022 | Pu | G06F 13/405 |
| 2022/0352563 A1* | 11/2022 | Park | H01M 10/4207 |
| 2022/0368364 A1* | 11/2022 | Martinez | H02J 7/0047 |
| 2023/0188312 A1* | 6/2023 | Guo | H04W 56/0015 |
| | | | 375/356 |
| 2025/0024326 A1* | 1/2025 | Nagashima | H04W 16/28 |
| 2025/0123336 A1* | 4/2025 | Miyake | H01M 10/48 |

* cited by examiner

SYSTEM AND METHOD OF WIRELESS COMMUNICATION IDENTIFICATION AND BATTERY WIRELESS MANAGEMENT SYSTEM THEREOF

CROSS REFERENCE

THE present invention claims priority to TW112101644, filed on Jan. 13, 2023.

BACKGROUND OF THE INVENTION

Field of Invention

The present invention relates to a wireless communication identification technique, in particular a wireless communication identification technique used in a battery wireless management system for identifying wireless communication units by a signal level adjustment scenario, such as limiting the count of wireless communication units that respond to a wireless signal, which can be also applied to synchronize the timing of the wireless communication units by the wireless signal.

Description of Related Art

The battery management system includes a large amount of battery cells and modules, which require internal sensing and identification capability for various battery cells and modules. The internal sensing and identification include but not limited to: electrical performance of each battery cell, factory setting identification information, and communication identification between battery cells. However, wireless identification is rarely in the battery management system because of problems caused by the wireless identification, such as each wireless communication unit needs to be identified (not only the signal identification, but the position identification). For example, when a wireless communication unit needs to determine where it is, the aforementioned internal or factory set identification information cannot afford this.

In current battery management systems, the connection between battery units often works by means of a wired daisy chain, which determines the proximity relation between the communication units based on the sequence of the wire connections. However, the wired connections often form long wires, and the high impedance of these long wires may consume considerable energy. In addition, if the positions of some communication units in the wired daisy chain connection is changed, it is difficult to re-wire.

In view of this, it is important to provide a wireless daisy chain connection in the battery management system for providing wireless communication between battery units without needs of wire sorting, to allow simple and clear location identification of communication units in the wireless connection.

SUMMARY OF THE INVENTION

In view of the above technical nee, the present invention provides a wireless communication identification system, for signal communication in a battery management system. The wireless communication identification system includes: a master wireless communication unit, sending a first wireless signal initially from a starting signal level, and progressively limiting a count of the wireless communication units responding to the first wireless signal in the wireless communication identification system, according to a signal level adjustment scenario; and a first wireless communication unit, being the last responding unit to the first wireless signal by categorizing the remaining wireless communication units according to the signal level adjustment scenario. A first wireless signal connection is established between the master wireless communication unit and the first wireless communication unit by the first wireless signal, and the wireless communication identification system transmits first unit identity information of the first wireless communication unit via the first wireless signal connection. Therein, when the wireless communication units responding to the first wireless signal, the internal circuits in the wireless communication units receive the first wireless signal and accordingly process the corresponding operation in the internal circuits.

In one perspective, before the level adjustment process is performed, the physical distance of the between the wireless communication units in battery management system is unknown.

In one perspective, the aforementioned progressively limiting step can be: reducing the count of the count of the wireless communication units responding to the wireless signal, or limit the count of the wireless communication units responding to the wireless signal until the count is within an acceptable range.

In one embodiment, the categorizing step includes: determining the last one of the remaining wireless communication units responding to the first wireless signal, to be the first wireless communication unit; or determining the first wireless communication unit based on signal level rankings of the remaining wireless communication units receiving or responding to the first wireless signal. In one embodiment, the first wireless communication unit sends a second wireless signal, and the categorizing step includes: determining the last one of the remaining wireless communication units to respond to the second wireless signal, to be the second wireless communication unit; or, the second wireless communication unit is the last wireless communication unit responding to the second wireless signal among the remaining wireless communication units; or, determining the second wireless communication unit based on signal level rankings of the remaining wireless communication units responding to the second wireless signal.

In one embodiment, the starting signal level is a high preset signal strength, and the signal level adjustment scenario includes: progressively reducing the signal strength of the first wireless signal initially from the high preset signal strength; or, the starting signal level is a high preset signal-to-noise ratio, and the signal level adjustment scenario includes: progressively reducing signal-to-noise ratios of the responding units initially from the high preset signal-to-noise ratio, for responding to the first wireless signal. The signal strength of the first wireless signal or the signal-to-noise ratio for responding to the first wireless signal, is progressively reduced until a count of the responding units to the first wireless signal is to be a first remaining count.

In one embodiment, when the first remaining count is equal to one, the last responding unit to the first wireless signal is determined to be the first wireless communication unit.

In one embodiment, when the signal strength of the first wireless signal is progressively reduced to a first minimum responding strength and the first remaining count is larger than one, the signal-to-noise ratios of the responding units to respond the first wireless signal are progressively reduced, for reducing the count of the responding units to be one, wherein the last responding unit to the first wireless signal is determined to be the first wireless signal. Or, when the signal-to-noise ratios of the responding units to respond the first wireless signal are progressively reduced to a minimum signal-to-noise ratio and the first remaining count is larger than one, the master wireless communication unit progressively reduces the signal strength of the first wireless signal, for reducing the count of the responding units to be equal to one, wherein the last responding unit to the first wireless signal is determined to be the first communication unit.

In one embodiment, the signal level adjustment scenario includes: progressively reducing the signal-to-noise ratio of the responding units to the first wireless signal, wherein when the signal-to-noise ratio is reduced to a first minimum signal-to-noise ratio, and there are plural responding units in the remaining wireless communication units for responding to the first wireless signal (the first remaining count is larger than one), the master wireless communication unit progressively reduces the signal strength of the first wireless signal, to progressively reduce the count of the responding units to the first wireless signal to be equal to one.

In one embodiment, the signal strength of the first wireless signal is progressively reduced to a first minimum responding strength, or the signal-to-noise ratios of the responding units in the remaining wireless communication units for responding to the first wireless signal is progressively reduced to a first minimum signal-to-noise ratio, and there are plural responding units in the remaining wireless communication units for responding to the first wireless signal, the wireless communication identification system generates a responding identification information group for respectively identifying the responding units. Therein, the responding units includes the first wireless communication unit. In the remaining wireless communication units, the first wireless communication unit includes a maximum received signal strength of the first wireless signal, or a maximum signal-to-noise ratio for responding to the first wireless signal.

In one embodiment, the starting signal level is a starting low signal strength, and the signal level adjustment scenario includes: progressively increasing the signal strength of the first wireless signal initially from the starting low signal strength; or, the starting signal level is a starting low signal-to-noise ratio, and the signal level adjustment scenario including: progressively increasing the signal-to-noise ratios of the remaining wireless communication units initially from the starting signal level for responding to the first wireless signal. The signal strength or the signal-to-noise ratio, is progressively increased until the count of the responding units to the first wireless signal is to be a first remaining count. The first remaining count is larger or equal to one In one embodiment, when the first remaining count is equal to one, the last responding unit to the first wireless signal is the first wireless communication unit.

In one embodiment, the starting signal level is a low signal strength. When the first remaining count is larger than one (multiple responding units respond to the first wireless signal), the signal-to-noise ratios for responding to the first wireless signal are progressively reduced, to reduce the count of responding units to the first wireless signal to be equal to one.

In one embodiment, the starting signal level is a starting low signal-to-noise ratio. When the first remaining count is larger than one (multiple responding units to the first wireless signal), the master wireless communication unit progressively reduces the signal strength of the first wireless signal to progressively reduce the count of responding units to the first wireless signal to be one.

In one embodiment, the first wireless communication unit sends a second wireless signal initially from a starting signal level, and progressively limits the count of the remaining wireless communication units (except the first wireless communication unit) responding to the second wireless signal, according to a signal level adjustment scenario, until the count of the responding units is equal to the second remaining count. The responding units to the second wireless signal, includes a second wireless communication unit. In the signal level adjustment scenario, the second wireless communication unit is the last responding unit in the remaining wireless communication units (except the first wireless communication unit), to the second wireless signal.

In one embodiment, the starting signal level is a high preset signal strength, and the signal level adjustment scenario includes progressively reducing the signal strength of the second wireless signal initially from the high preset signal strength, the signal level adjustment scenario includes progressively reducing the signal-to-noise ratios of the remaining wireless communication units for responding to the second wireless signal. The aforementioned progressively reducing the signal strength or progressively reducing the signal-to-noise ratios for responding to the second wireless signal, can progressively reduce the count of responding units in the remaining wireless communication units, to the second remaining count.

In one embodiment, the starting signal level is a starting low signal strength and the signal level adjustment scenario includes: progressively increasing the signal strength of the second wireless signal initially from the starting low signal strength. Or, the starting signal level is a starting low signal-to-noise ratio and the signal level adjustment scenario includes: progressively increasing the signal-to-noise ratios of the remaining wireless communication units for responding to the second wireless signal initially from the starting low signal-to-noise ratio. The aforementioned progressively increasing the signal strength or progressively increasing the signal-to-noise ratios for responding to the second wireless signal, can proceed until the count of responding units in the remaining wireless communication units for responding to the second wireless signal, to the second remaining count.

In one embodiment, after the second wireless communication unit responding to the second wireless signal, a second wireless signal connection is established between the first wireless communication unit and the second wireless communication unit, and the wireless communication identification system transmits the second unit identity information of the second wireless communication unit via the second wireless signal connection. In one embodiment, the master wireless communication unit, the first wireless communication unit and the second wireless communication unit are one by one connected sequentially via the first wireless signal connection and the second wireless signal connection, which form a wireless daisy chain.

In one embodiment, the wireless communication identification system sends a wireless time calibration signal via a wireless daisy chain connection. The wireless communication unit in the wireless communication identification system can be connected via the wireless daisy chain and synchronously calibrated their internal circuit times based on the wireless time calibration signal.

In one embodiment, the wireless time calibration signal has a calibration period which is based on the accumulated deviation of the clock of the internal circuit and/or the sampling frequency of the wireless communication unit.

In one embodiment, the distance between the first wireless communication unit and the master wireless communication unit, is shorter than the distance between the second wireless communication unit and the master wireless communication unit.

In one embodiment, after the level adjustment process is accomplished, a physical distance relationship can be accurately formed between all of the wireless communication units, for example, the first wireless communication unit, the second wireless communication unit, and the master wireless communication unit.

According to a perspective, the invention provides a wireless communication identification method for identifying a plurality of wireless communication units. The wireless communication identification method includes: determining a master wireless communication unit among the wireless communication units, the master wireless communication unit sending a first wireless signal initially from a starting signal level, and progressively limiting a count of the wireless communication units responding to the first wireless signal in the wireless communication identification system according to a signal level adjustment scenario; determining a first wireless communication unit, the first wireless communication unit being the last responding unit to the first wireless signal by categorizing the remaining wireless communication units according to the signal level adjustment scenario; and after the first wireless communication unit responding to the first wireless signal, establishing a first wireless signal connection between the master wireless communication unit and the first wireless communication unit, and the wireless communication identification system transmitting first unit identity information of the first wireless communication unit via the second wireless signal.

In one embodiment of the wireless communication identification method, the starting signal level is a high preset signal strength, and the signal level adjustment scenario includes: progressively reducing the signal strength of the second wireless signal initially from the high preset signal strength; or, the starting signal level is a high preset signal-to-noise ratio, and the signal level adjustment scenario includes: progressively reducing the signal-to-noise ratios of the responding units to respond to the second wireless signal initially from the preset high signal-to-noise; wherein the signal-to-noise ratios or the signal strength for responding to the second wireless signal, is progressively reduced until the second remaining count is equal to one, wherein the last remaining unit responding to the second wireless signal is determined to be the second wireless communication unit.

In one embodiment of the wireless communication identification method, the starting signal level is a starting low signal strength, and the signal level adjustment scenario includes: progressively increasing the signal strength of the second wireless signal initially from the starting low signal strength; or, the starting signal level is a starting low signal-to-noise ratio, and the signal level adjustment scenario includes: progressively increasing the signal-to-noise ratios of the remaining wireless communication units except the first wireless communication unit, to respond the second wireless signal initially from the starting low signal-to-noise ratio, wherein the signal-to-noise ratios or the signal strength for responding to the second wireless signal, is progressively increased until a count of the responding units is to be the second remaining count. The last responding unit to the second wireless signal, is determined to be the second wireless communication unit.

In one embodiment of the wireless communication identification method, the first wireless communication unit sends a second wireless signal initially from the starting signal level and progressively limits a count of the remaining wireless communication units except the first wireless communication unit, responding to the second wireless signal according to the signal level adjustment scenario, to be a second remaining count. The plural responding units include a second wireless communication unit, and the last responding unit to the second wireless signal is determined to be this second remaining count.

In one embodiment, the first wireless signal connection and the second wireless signal connection form a wireless daisy chain connection.

According to one perspective, the present invention provides a battery wireless management system, which includes: a master device, including a master wireless communication unit; and a plurality of slave devices, respectively including a plurality of battery units and a plurality of wireless communication units, wherein the master wireless communication unit sends a first wireless signal initially from a starting signal level and progressively limits a count of the remaining wireless communication units responding to the first wireless signal according to a signal level adjustment scenario; a first wireless communication unit, being the last responding unit to the first wireless signal by categorizing the remaining wireless communication units according to the signal level adjustment scenario, wherein the slave device disposing the first wireless communication unit is determined to be a first slave device. A first wireless signal connection is established between the master wireless communication unit and the first wireless communication unit via the first wireless signal, and the battery wireless management system transmits first unit identity information of the first wireless communication unit via the first wireless signal connection.

In one embodiment, the first wireless communication unit sends a second wireless signal initially from the starting signal level and progressively limits a count of the remaining wireless communication units responding to the second wireless signal according to the signal level adjustment scenario. The last responding unit to the second wireless signal is determined to be the second wireless communication unit, and the slave device disposing the second wireless communication unit is determined to be a second slave device.

In one embodiment, the aforementioned last responding unit, can be the last and the only one left responding unit to respond to the specific wireless signal (first or second wireless signal). That is, the count of the responding unit to the specific wireless signal is equal to one.

DESCRIPTION OF THE PREFERRED EMBODIMENTS

The objectives, technical details, features, and effects of the present invention will be better understood with regard to the detailed description of the embodiments below, with reference to the figures.

Figure 1A:
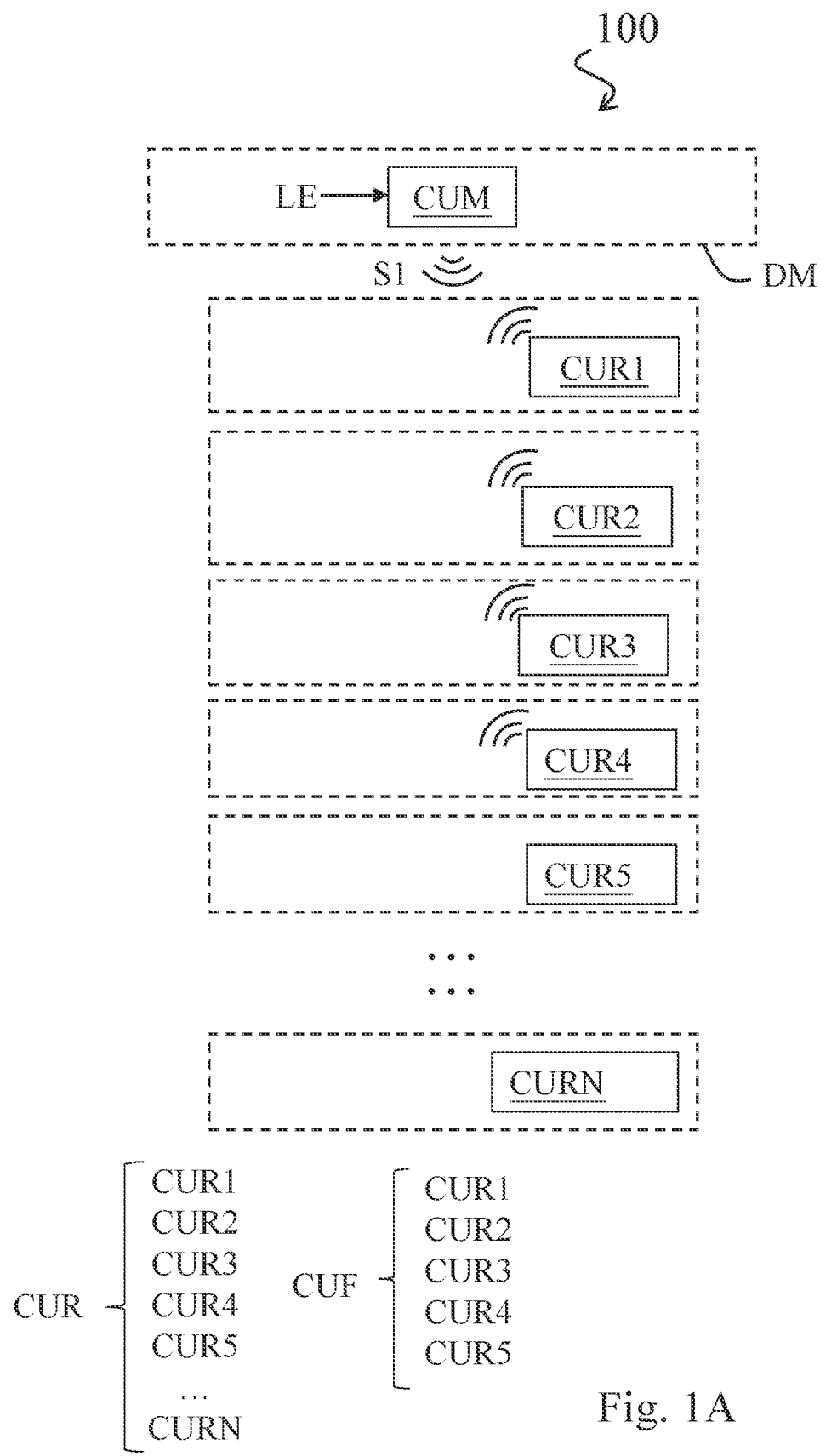
FIGS. 1A, 1B and 1C respectively illustrate schematic diagrams for operations based on a signal level adjustment scenario in a wireless communication identification system according to one embodiment of the present invention.

Please refer to FIG. 1A, wherein a wireless communication identification system 100 provided by the present invention is shown. The wireless communication identification system 100 includes a plurality of wireless communication units, which are respectively disposed in a plurality of wireless communication capable devices (dashed line boxes in the figures). The wireless devices may be arranged side by side, or in a stacked or scattered disposition. The wireless communication identification system 100 includes: a master wireless communication unit CUM, sends a first wireless signal S1 initially from a starting signal level LE and progressively limits a count of remaining wireless communication units CUR (the wireless communication units except the master wireless communication unit CUM; as one illustrative example, the remaining wireless communication units CUR1 to CUR4 as shown in FIG. 1A; the remaining wireless communication units CUR1 to CUR2 in FIG. 1B; and the remaining wireless communication unit CUR1 in FIG. 1C) responding to the first wireless signal S1 in the wireless communication identification system 100, according to a signal level adjustment scenario SCE; and a first wireless communication unit CU1, wherein the first wireless communication unit CU1 can be the last responding unit in the remaining wireless communication units CUR responding to the first wireless signal S1 by a categorizing step CL according to the signal level adjustment scenario SCE (FIG. 1C shows that only the remaining wireless communication units CUR1 responds to the first wireless signal S1). In the signal level adjustment scenario SCE, after determining that the first wireless communication unit CU1 according to the last wireless communication unit responding to the first wireless signal S1, a first wireless signal connection RC1 (FIG. 1C) is established between the master wireless communication unit CUM and the first wireless communication unit CU1 by means of the first wireless signal S1. The wireless communication identification system 100 generates and transmits the first unit identity information ID1 of the first wireless communication unit CU1 in the first wireless signal connection RC1

The aforementioned devices with wireless communication capabilities (such as energy storage devices, information storage devices, controllers, machines, etc.), whose application fields can be determined by the user according to practical needs.

Figure 2A:
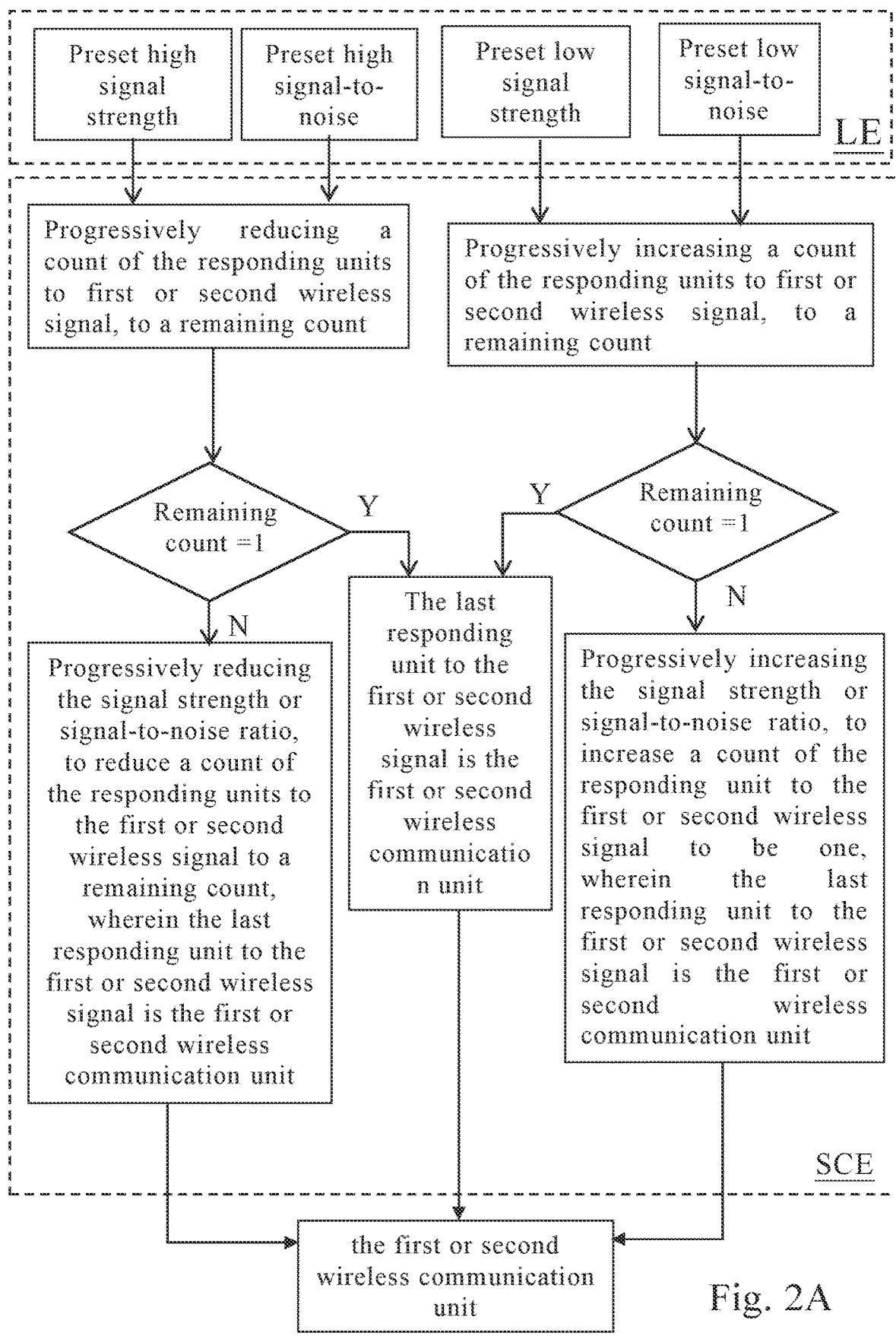
FIGS. 2A and 2B illustrate various patterns of the starting signal level and the categorizing step in a signal level adjustment scenario according to one embodiment of the present invention.

Please refer to FIG. 2A, wherein the starting signal level LE is the initial level setting, which can include four options: high preset signal strength, high preset signal-to-noise ratio, starting low signal strength, and starting low signal-to-noise ratio. The implementation details of these options are described in the subsequent examples. In the aforementioned embodiment, the master unit identity information of the master wireless communication unit CUM can be generated by the wireless communication identification system 100, or otherwise determined.

Figure 2B:
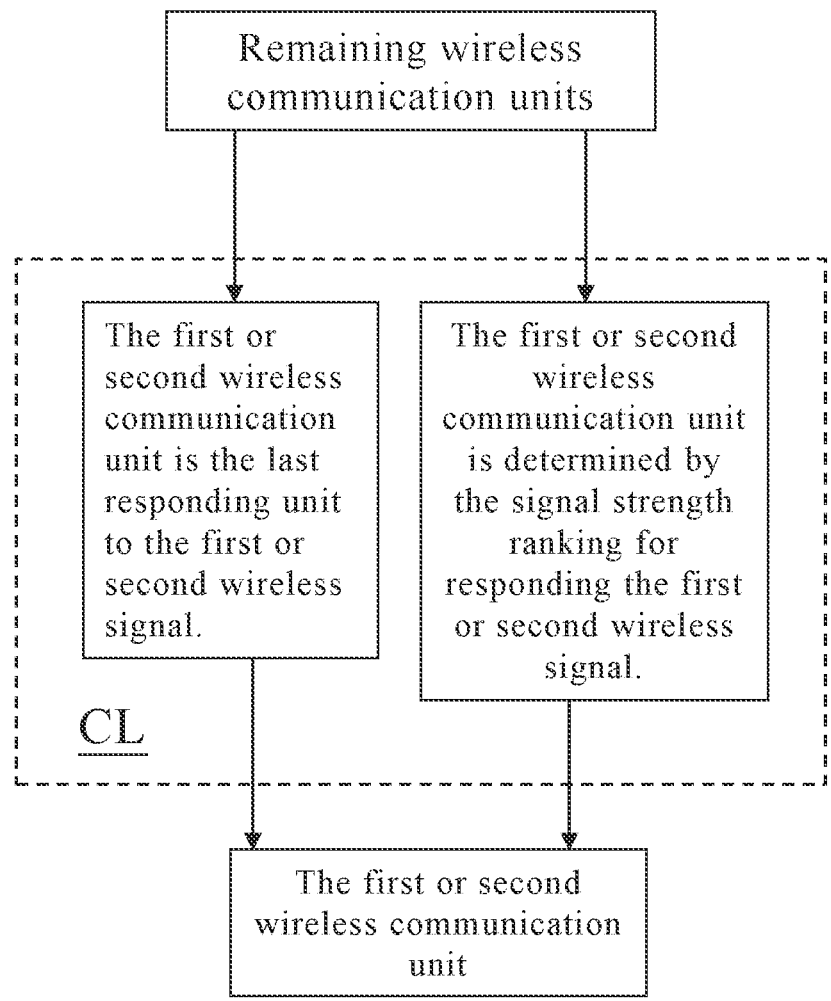

Please refer to FIG. 2B, in one embodiment, wherein the categorizing step CL includes: determining the first wireless communication unit CU1 according to the last wireless communication unit to respond to the first wireless signal S1 among the remaining wireless communication units CUR (as described in the previous embodiment); or, determining the first wireless communication unit CU1 according to a signal level ranking of the wireless communication units responding to the first wireless signal S1 in the remaining wireless communication units CUR. In particular, the signal level ranking includes a signal strength ranking, or a signal-to-noise ratio ranking. For example, the wireless communication unit with the highest responding strength ranking (or the highest signal to noise ranking) is determined to be the first wireless communication unit CU1.

Figure 3A:
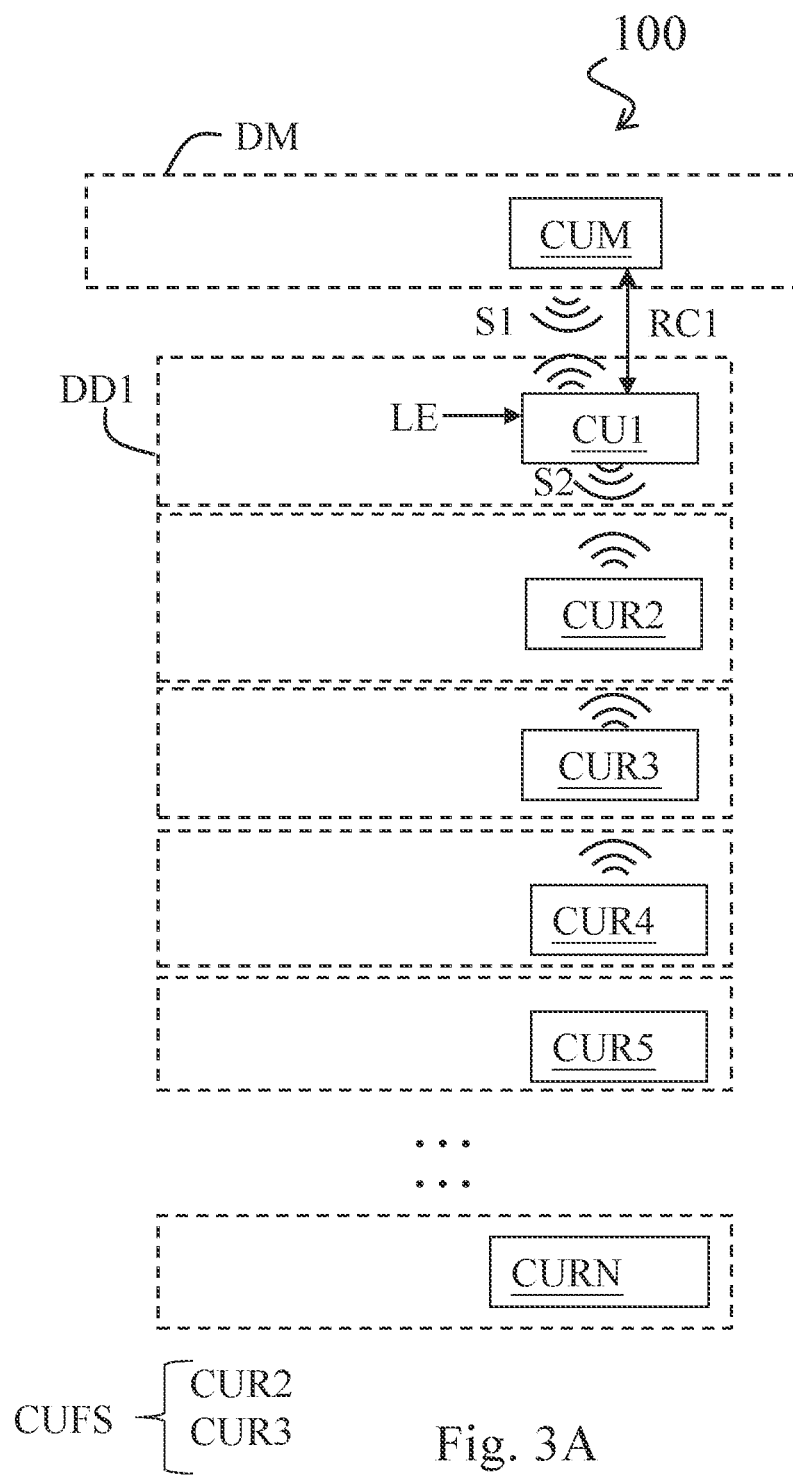
FIGS. 3A and 3B illustrate a schematic diagram of the operation of a signal level adjustment scenario in a wireless communication identification system according to one embodiment of the present invention.
Figure 3B:
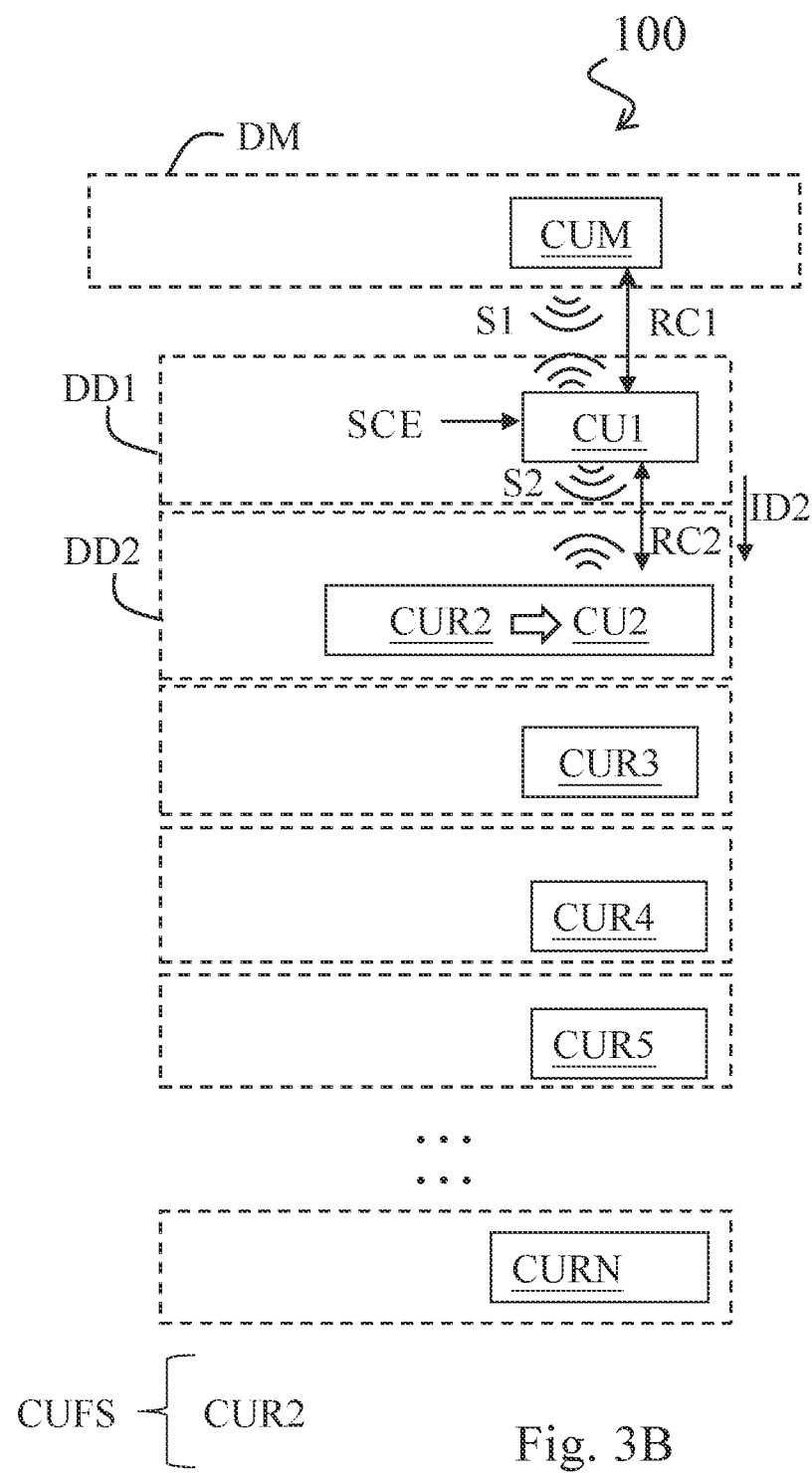

As shown in FIGS. 2B, 3A and 3B, in one embodiment, when the first wireless communication unit CU1 sends a second wireless signal S2, the categorizing step CL includes: determining the second wireless communication unit CU2 by means of determining the last responding unit in the remaining wireless communication units CUR to respond to the second wireless signal S2. Or, the second wireless communication unit CU2 is determining by the signal level ranking of the wireless communication units responding to the second wireless signal S2.

In several embodiments of the present invention, the step of determining the last responding unit to the wireless signal (one option step of the categorizing step CL) may also be changed by determining by a signal level ranking of the wireless communication units responding to first wireless signal S1 (another step of the categorizing step CL).

Figure 1B:
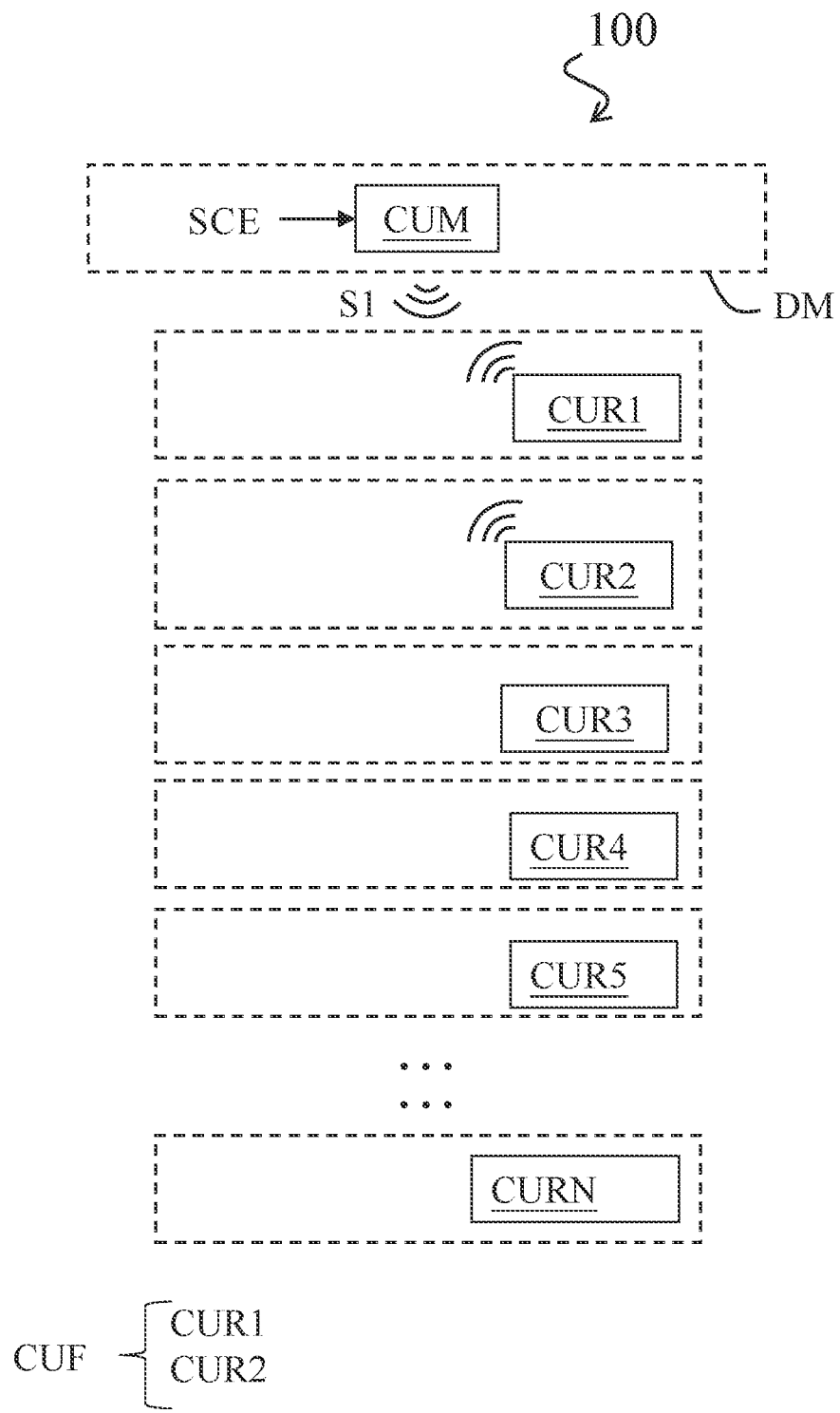
Figure 1C:
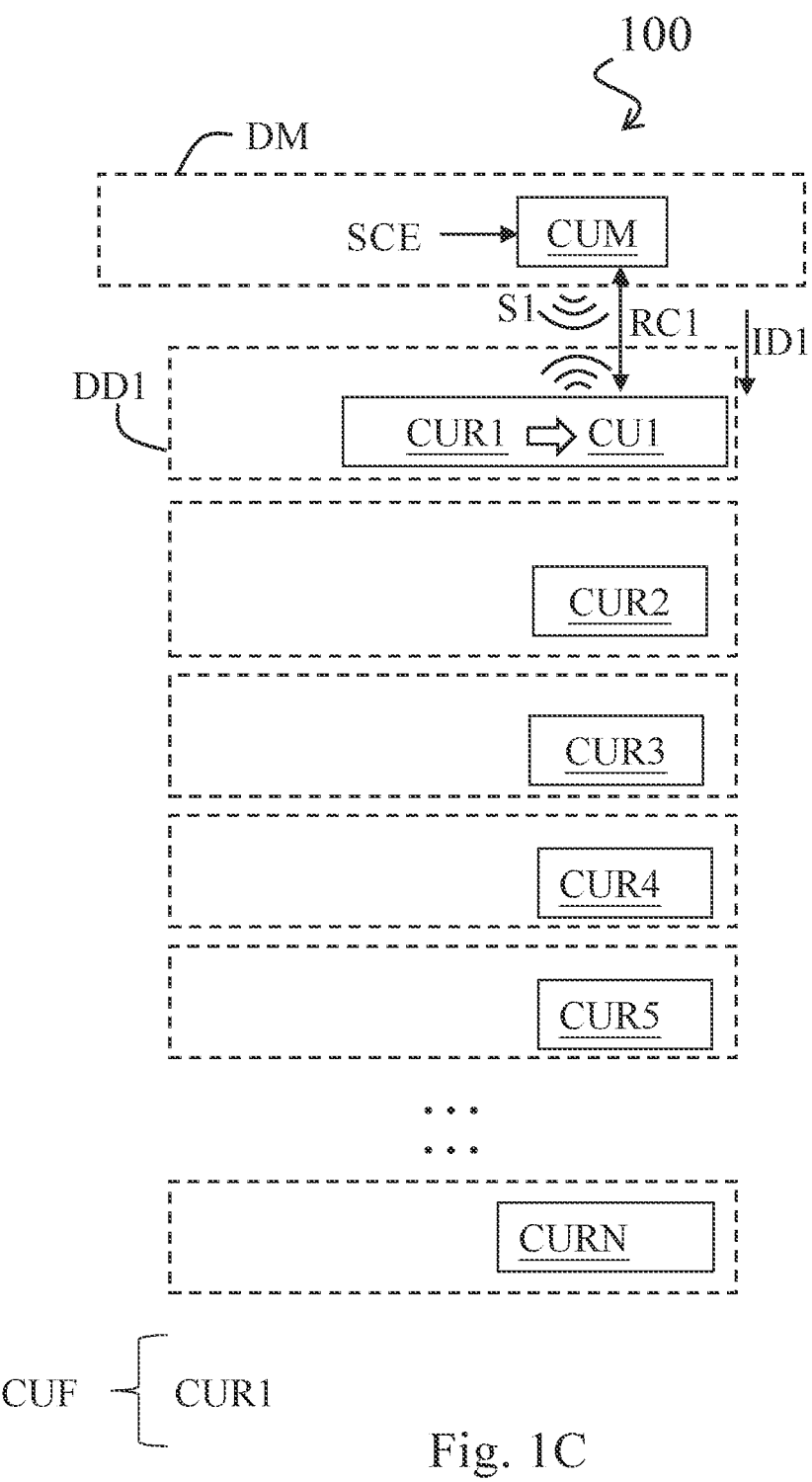

As shown in FIGS. 1A to 1C and 2A, in one embodiment, the starting signal level LE is a high preset signal strength. This high preset signal strength can be a maximum received signal strength (or a suitable high signal strength) of the first wireless signal S1 from the master wireless communication unit CUM. By the first wireless signal S1 with the high preset signal strength, the remaining wireless communication units CUR (e.g. wireless communication units CUR1 to CUR5, etc.), can start to communicate with the master wireless communication unit CUM. The signal level adjustment scenario SCE can progressively reduce the signal strength of the first wireless signal S1 initially from the high preset signal strength, wherein multiple wireless communication units (e.g. CUR1 to CUR5) communicating with the master wireless communication unit CUM. The multiple wireless communication units communicate with the master wireless communication unit CUM are called the responding units CUF. The progressively reducing of the signal strength can progressively reduce a count of responding units CUF to the first wireless signal S1 in the remaining wireless communication units CUR. In FIG. 1A to 1C, the count of responding units CUF to the responding unit is progressively reduced to a first remaining count.

Please refer to FIGS. 1A to 1C and 2A, in one embodiment, wherein the starting signal level LE may be a high preset signal-to-noise ratio. The remaining wireless communication units (CUR1 to CURN) in the wireless communication identification system 100, can communicate with the master wireless communication unit CUM, initially from a preset signal-to-noise ratio for responding to the first wireless signal S1. The signal level adjustment scenario SCE includes: progressively reducing the signal-to-noise ratios of the remaining wireless communication units CUR responding to the first wireless signal S1 initially from the high preset signal-to-noise ratio, for progressively reducing a count of the responding units CUF to the first wireless signal S1, to be a first remaining count. FIGS. 1A to 1C, respectively show the progressively reducing operations in terms of the count variation of the responding units CUF in the process. The high signal-to-noise ratio for responding to the first wireless signal S1 in the responding units CUF can be controlled to reduce the count of the responding units CUF.

In one embodiment, when the first remaining count is equal to one (e.g., the responding unit CUF includes only the wireless communication unit CUR1 as shown in FIG. 1C), the last responding unit that responds to the first wireless signal S1 is the first wireless communication unit CU1.

In the implementation of progressively reducing the first wireless signal S1 initially from the starting signal level LE, no matter whether the starting signal level LE is the high preset signal strength or the high preset signal-to-noise ratio, the distance between the wireless communication units during the process of progressively reducing the starting signal level LE can influence the responding capability of the wireless communication units to the first wireless signal S1, such that the count of responding units to the first wireless signal S1 (i.e. the first remaining count) is progressively reduced. Therefore, the first wireless communication unit CU1 is the closest wireless communication unit to the master wireless communication unit CUM among the remaining wireless communication units CUR.

In one embodiment, the signal level adjustment scenario SCE starts with a progressive reduction initially from the starting signal level LE and may end up with multiple responding communication units to the first wireless signal S1. For example, the master wireless communication unit CUM may have a limited capable reduction range of the signal strength, or the responding units CUF may have over high signal sensitivities to the first wireless signal S1. In one embodiment, when the signal strength of the first wireless signal S1 is progressively reduced to a first minimum responding strength (e.g. the lowest signal strength of the master wireless communication unit CUM sends the first wireless signal S1), there are still multiple responding units CUF to the first wireless signal S1 (i.e. the first remaining count is larger than one), and the signal-to-noise ratios of the responding units CUF for responding to the first wireless signal are progressively reduced, in order to progressively reduce the count of responding units CUF to the first wireless signal S1 to be one. In this way, the signal level adjustment scenario SCE is initially to reduce the signal strength and then to reduce the signal-to-noise ratio for responding to the first wireless signal, wherein the present invention provides a flexible combination of the signal strength and the signal-to-noise ratio. The signal strength and the signal-to-noise ratio for responding to the first wireless signal S1 can be combined, for more efficiently and progressively reducing the count of wireless communication units responding to the first wireless signal S1 to be one.

In the present embodiment, reducing both of the signal strength of the first wireless signal S1 and the signal-to-noise ratio for responding to the first wireless signal S1, is not limited to the manner of the preceding embodiments. In one embodiment, the signal level adjustment scenario SCE includes: an initial progressive reduction in the signal-to-noise ratio of the responding units CUF for responding to the first wireless signal S1. When the signal-to-noise ratios are progressively reduced to a first minimum signal-to-noise ratio (a minimum signal-to-noise ratio of the remaining wireless communication units CUR for responding to the first wireless signal S1), and there are still multiple responding units CUF in the remaining wireless communication units CUR to the first wireless signal S1 (the first remaining count is larger than one), the master wireless communication unit CUM progressively reduces the signal strength of the first wireless signal S1 for reducing the count of responding units CUF to the first wireless signal S1, to be one.

In the aforementioned embodiment, the first wireless signal connection RC1 is formed between the master wireless communication unit CUM and the first wireless communication unit CU1 (FIG. 1C) in a one-to-one wireless connection.

As shown in FIGS. 1A and 1B, in one embodiment, the signal level adjustment scenario SCE includes: progressively reducing the signal strength of the first wireless signal S1 to the first minimum responding strength, or progressively reducing the signal-to-noise ratios of the responding units CUF in the remaining wireless communication units to the first wireless signal S1, to a signal-to-noise ratio lower limit. The wireless communication identification system 100 directly makes use of the first minimum responding strength, to have multiple responding units CUF among the remaining wireless communication units responding to the first wireless signal S1. The wireless communication identification system 100 generates and transmits the responding identification information group of these multiple responding units CUF directly through the first wireless signal S1. This creates a one-to-many wireless signal connection between wireless communication units (instead of the aforementioned one-to-one wireless signal connection between wireless communication units). For example, when the signal strength or the signal-to-noise ratio is progressively reduced to reach the bottom limit of the capability, and the first remaining count of the responding units is larger than one, a one-to-many wireless signal connection can be established and the responding identification information group of the responding units CUF can be transmitted to the wireless communication units for identifying purpose. In addition, the multiple responding units CUF can include the aforementioned first wireless communication unit CU1, except the master wireless communication unit CUM. The first wireless communication unit CU1 can be decided according to a maximum received signal strength or a maximum signal-to-noise ratio for responding to the first wireless signal S1.

In one embodiment, the aforementioned high preset signal strength or high preset signal-to-noise ratio may be the highest signal strength or highest signal-to-noise ratio of the wireless communication unit.

According to the invention, the starting signal level LE can be not limited to the high preset signal strength or the high preset signal-to-noise ratio, and the starting signal level LE can also be a low level. In one embodiment, the starting signal level LE is a starting low signal strength, and the signal level adjustment scenario SCE includes: progressive increasing the signal strength of the first wireless signal S1 initially from the starting low signal strength. Or, the starting signal level LE is a starting low signal-to-noise ratio, and the signal level adjustment scenario SCE includes: progressively increasing the signal-to-noise ratios of the remaining wireless communication units CUR for responding to the first wireless signal S1 initially from the starting low signal-to-noise ratio (when not sure which wireless communication units can respond to the first wireless signal S1 at this moment, and the signal-to-noise ratios of the remaining wireless communication units CUR are progressively increased for finding the responding unit to respond to the first wireless signal S1). The aforementioned progressively increasing signal strength or progressively increasing signal-to-noise ratio, is proceeded until the count of the remaining wireless communication units CUR responding to the first wireless signal S1 is to be a first remaining count (for example, the first remaining count is at least one). The signal strength of the first wireless signal S1 is progressively increased or the signal-to-noise ratios of the remaining wireless communication units CUR for responding to the first wireless signal S1 are progressively increased, until the responding unit CUF to the first wireless signal S1is determined (e.g., please refer to FIG. 1B or 1C, for when the responding unit CUF appears). The count of the responding unit CUF can be one (the first remaining count is equal to one, e.g., as shown in FIG. 1C), and the responding unit CUF is the first wireless communication unit CU1. Or, the count of responding units CUF can be larger than one (the first remaining count is larger than one, e.g., as shown in FIGS. 1A and 1B).

In one embodiment, a solution is provided for a plurality of responding units CUF to the first wireless signal S1 after the progressive increasing the signal strength. In a case that the starting signal level LE is a starting low signal strength and the first remaining count is larger than one, there are multiple responding units CUF to the first wireless signal S1 (e.g. FIG. 1A, 1B). Subsequently, the multiple responding units CUF progressively reduce the signal-to-noise ratio for responding to the first wireless signal S1, to progressively reduce the count of the responding units CUF to the first wireless signal S1 to be one, wherein the last responding unit CUF is the first wireless communication unit CU1 (FIG. 1C).

In one embodiment, the technique for limiting the plural responding units CUF to the first wireless signal S1 after progressively increasing signal-to-noise ratio is provided. In this case, the starting signal level LE is a starting low signal-to-noise ratio and the first remaining count is larger than one, which means that there are still multiple responding units CUF to the first wireless signal S1 (for example as shown in FIGS. 1A, 1B). Afterwards, the master wireless communication unit CUM progressively reduces the signal strength of the first wireless signal S1, to progressively reduces the count of the responding units CUF to the first wireless signal S1 to be one. The last responding unit CUF is the first wireless communication unit CU1 (for example as shown in FIG. 1C).

In one embodiment, besides the first wireless signal connection RC1 between the master wireless communication unit CUM and the first wireless communication unit CU1 as described above, the first wireless communication unit CU1 can also establish another signal connection with other wireless communication units in the remaining wireless communication units CUR. Please refer to FIG. 3A, in one embodiment, wherein the first wireless communication unit CU1 sends a second wireless signal S2 initially from a starting signal level LE; and according to the signal level adjustment scenario SCE, the first wireless communication unit CU1 progressively limits the count of the responding units (for example, CUR2 to CUR4) to respond to the second wireless signal S2, in the remaining wireless communication units CUR except the first wireless communication unit CU1, to be a second remaining count (FIG. 3B). The second wireless communication unit CU2 (FIG. 3B) is included in the responding units CUF. In the signal level adjustment scenario SCE, the second wireless communication unit CU2 is the last responding unit in the remaining wireless communication units CUR to the second wireless signal S2, except the first wireless communication unit CU1. The responding units CUF do not include the master wireless communication unit CUM and the first wireless communication unit CU1. The second remaining count can be managed in a similar manner to the first remaining count. When the second remaining count is equal to one, the last responding unit in the remaining wireless communication units CUR2 to respond to the second wireless signal S2 is determined to be the second wireless communication unit CU2 (FIG. 3B).

In one embodiment, the starting signal level LE is a high preset signal strength, and the signal level adjustment scenario SCE includes: progressively reducing the signal strength of the second wireless signal S2 initially from the high preset signal strength; or, the starting signal level LE is a high preset signal-to-noise ratio, and the signal level adjustment scenario SCE includes: progressively reducing the signal-to-noise ratio of the remaining wireless communication units CUR responding to the received second wireless signal S2 initially from the high preset signal-to-noise ratio. The aforementioned progressively reducing the signal strength or the signal-to-noise ratio for responding to the second wireless signal S2, is to progressively reduce the count of the responding units CUF responding to the second wireless signal S2 in the remaining wireless communication units CUR, to be the second remaining count (FIGS. 3A, 3B).

In one embodiment, the starting signal level LE is a starting low signal strength and the signal level adjustment scenario SCE includes: progressive increasing the signal strength of the second wireless signal S2 initially from the starting low signal strength. Or, the starting signal level LE is a starting low signal-to-noise ratio, and the signal level adjustment scenario SCE includes: progressive increasing the signal-to-noise ratio of the remaining wireless communication units for responding to the second wireless signal S2 initially from the starting low signal strength. The aforementioned signal strength or the signal-to-noise ratio for responding to the second wireless signal S2, is progressively increased until the count of the responding units CUF that respond the second wireless signal S2 is to be the second remaining count (FIGS. 3A, 3B). This second remaining count can be larger than or equal to one. The second wireless signal S2 is progressively increased initially from the starting signal level LE, and one or more responding units CUF can appear to respond to the second wireless signal S2. When the second remaining count is equal to one, the responding unit CUF that responds to the second wireless signal S2 is the second wireless communication unit CU2 (FIG. 3B).

In one embodiment, after the second wireless communication unit CU2 responds to the second wireless signal S2 from the first wireless communication unit CU1, a second wireless signal connection RC2 (FIG. 3B) can be established between the first wireless communication unit CU1 and the second wireless communication unit CU2 via the second wireless signal S2. The wireless communication identification system 100 transmits the second unit identity information ID2 of the second wireless communication unit CU2 in the second wireless signal connection RC2. In one embodiment, between the master wireless communication unit CUM, the first wireless communication unit CU1 and the second wireless communication unit CU2, the first wireless signal connection RC1 and the second wireless signal connection RC2 form a wireless daisy chain.

Figure 4A:
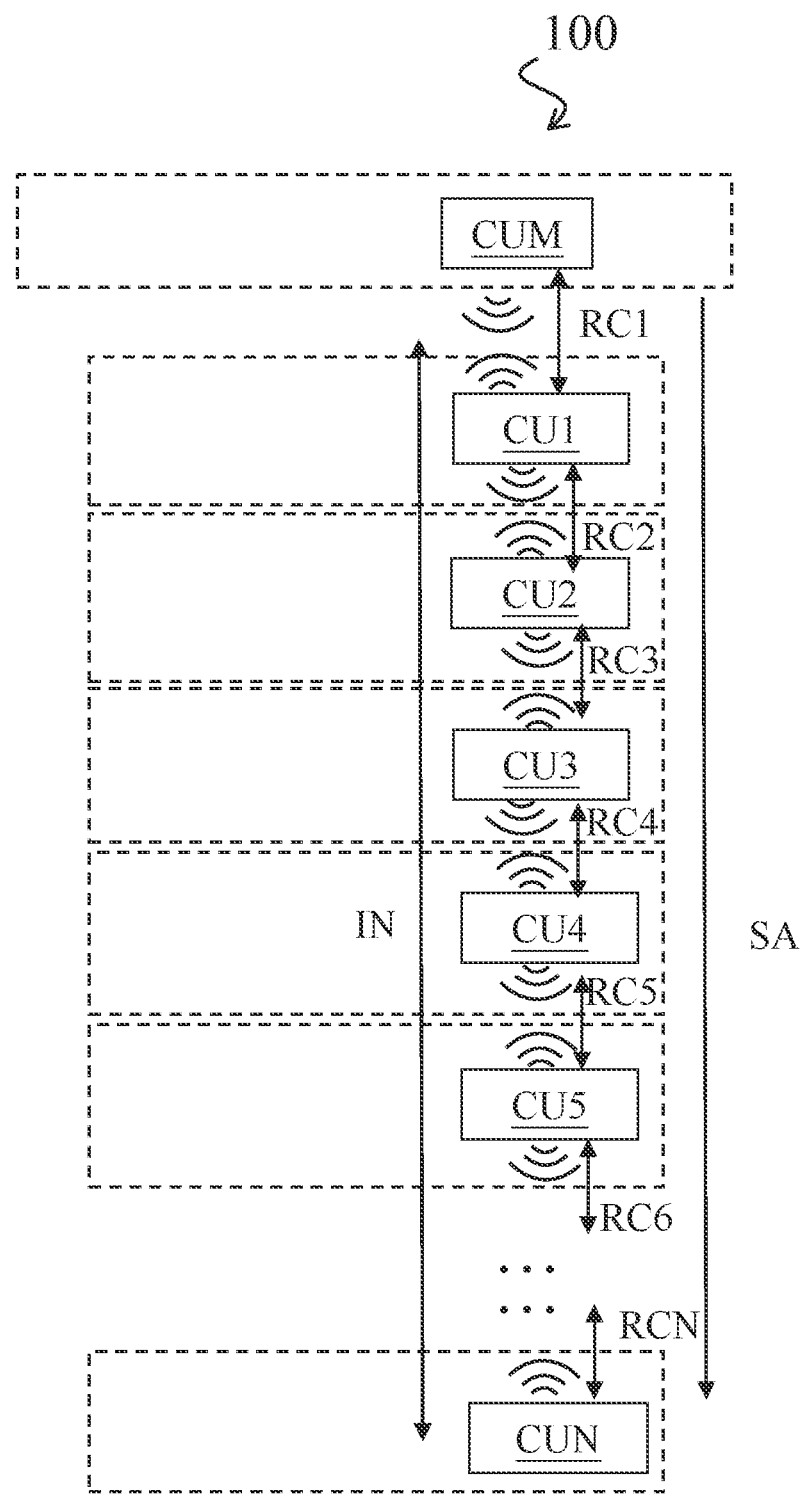
FIGS. 4A, 4B and 4C illustrate schematic diagrams of wireless timing according to various embodiments of the present invention.

In one embodiment as shown in FIG. 4A, the aforementioned wireless daisy chain connection can be formed between the master wireless communication unit CUM and each of the wireless communication units CU1, CU2, CU3, CU4, CU5 . . . , CUN (the wireless communication units CU1, CU2, CU3, CU4, CU5 . . . , CUN, respectively corresponding to the wireless communication units CUR3, CUR4, CUR5 . . . , CURN, after the remaining wireless communication units CUR identified via wireless communication). Therein the wireless signal connections RC1, RC2, RC3, RC4, RC5 . . . , CUN can be shown as examples in FIG. 4A.

Figure 4B:
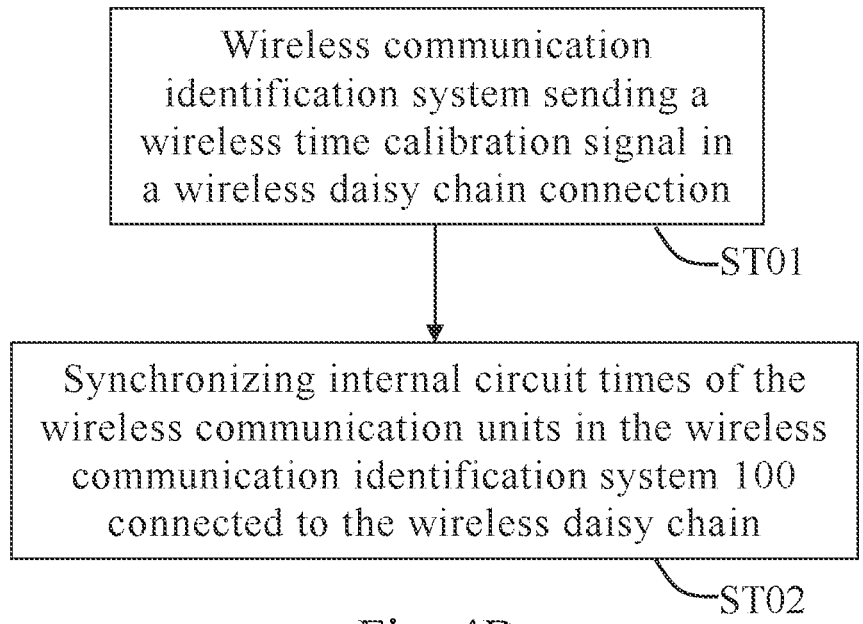

As shown in FIGS. 4A and 4B, in one embodiment, the present invention provides a wireless time calibration function, which includes the following steps: the wireless communication identification system 100 sends a wireless time calibration signal SA (ST01) in a wireless daisy chain; synchronizing the internal circuit times of the wireless communication units in the wireless communication identification system 100 connected to the wireless daisy chain, according to the wireless time calibration signal (ST02). Besides, when the master wireless communication unit CUM and the multiple wireless communication units CU1, CU2, CU3, CU4, CU5 of the responding identification information group and CUN are connected wirelessly, the master wireless communication unit CUM sends the wireless time calibration signal and the multiple wireless communication units CU1, CU2, CU3, CU4, CU5 and CUN synchronize their internal circuit time according to the time calibration signal.

As shown in FIG. 4A, in one embodiment, the master wireless communication unit CUM, the first wireless communication unit CU1 and the second wireless communication unit CU2 (or multiple wireless communication units CUM, CU1, CU2, CU3, CU4, CU5 . . . , and CUN), are connected to each other by the wireless daisy chain. Wherein the information is transmitted by the wireless daisy chain.

Figure 4C:
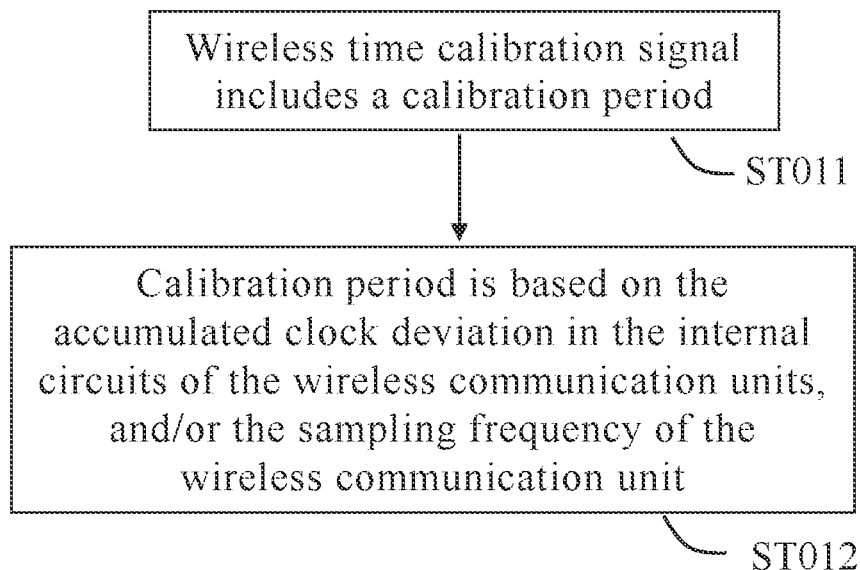

As shown in FIG. 4C, in one embodiment, the wireless time calibration signal includes a calibration period (ST011), which can be based on the accumulated clock deviation in the internal circuits of the wireless communication units, and/or the sampling frequency of the wireless communication unit (ST012). For example, a shorter calibration period is required when the accumulated clock deviation is higher. Another example is a shorter calibration period for higher sampling frequency. Yet another example is a longer calibration period for a lower accumulated clock deviation and/or sampling frequency. In this manner, the calibration period may be decided according to practical situations.

Please refer to FIGS. 3B and 4A, wherein a distance (spatial distance) between the first wireless communication unit CU1 and the master wireless communication unit CUM is shorter than a distance (spatial distance) between the second wireless communication unit CU2 and the master wireless communication unit CUM.

Figure 5:
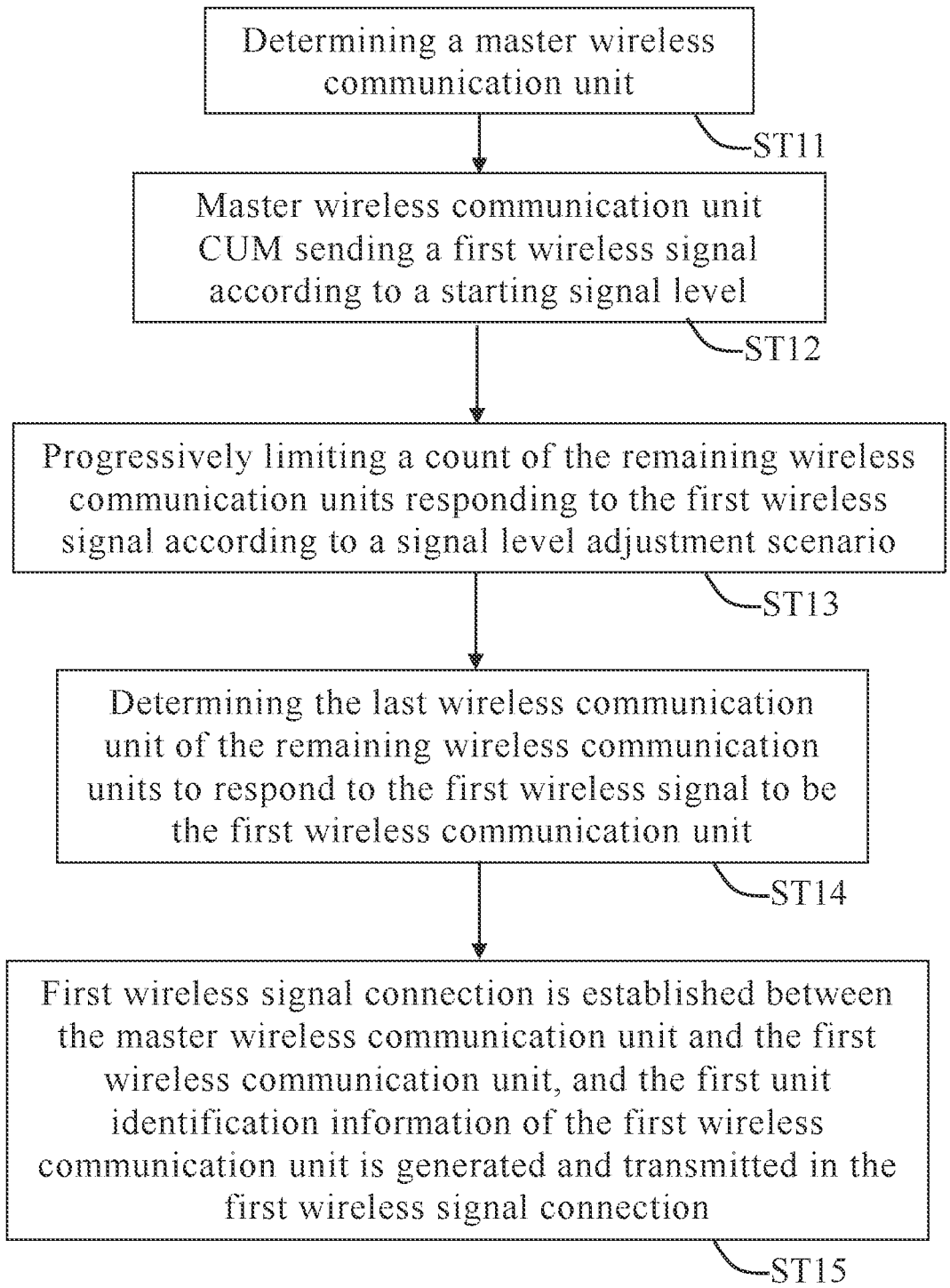
FIG. 5 illustrates a schematic flow diagram of a wireless communication identification method according to one embodiment of the present invention

In one perspective, the invention provides a wireless communication identification method for identifying multiple wireless communication units. In FIG. 5, the wireless communication identification method includes: determining a master wireless communication unit CUM among the wireless communication units (ST11); the master wireless communication unit CUM sending a first wireless signal S1 according to a starting signal level LE (ST12); progressively limiting a count of the remaining wireless communication units CUR responding to the first wireless signal S1 according to a signal level adjustment scenario SCE (ST13); determining the last wireless communication unit in the remaining wireless communication units CUR to respond to the first wireless signal S1 to be the first wireless communication unit CU1 (ST14); and after the first wireless communication unit CU1 responds to the first wireless signal S1, a first wireless signal connection RC1 is established between the master wireless communication unit CUM and the first wireless communication unit CU1, and the first unit identity information ID1 of the first wireless communication unit CU1 is generated and transmitted in the first wireless signal connection RC1 (ST15).

Figure 6:
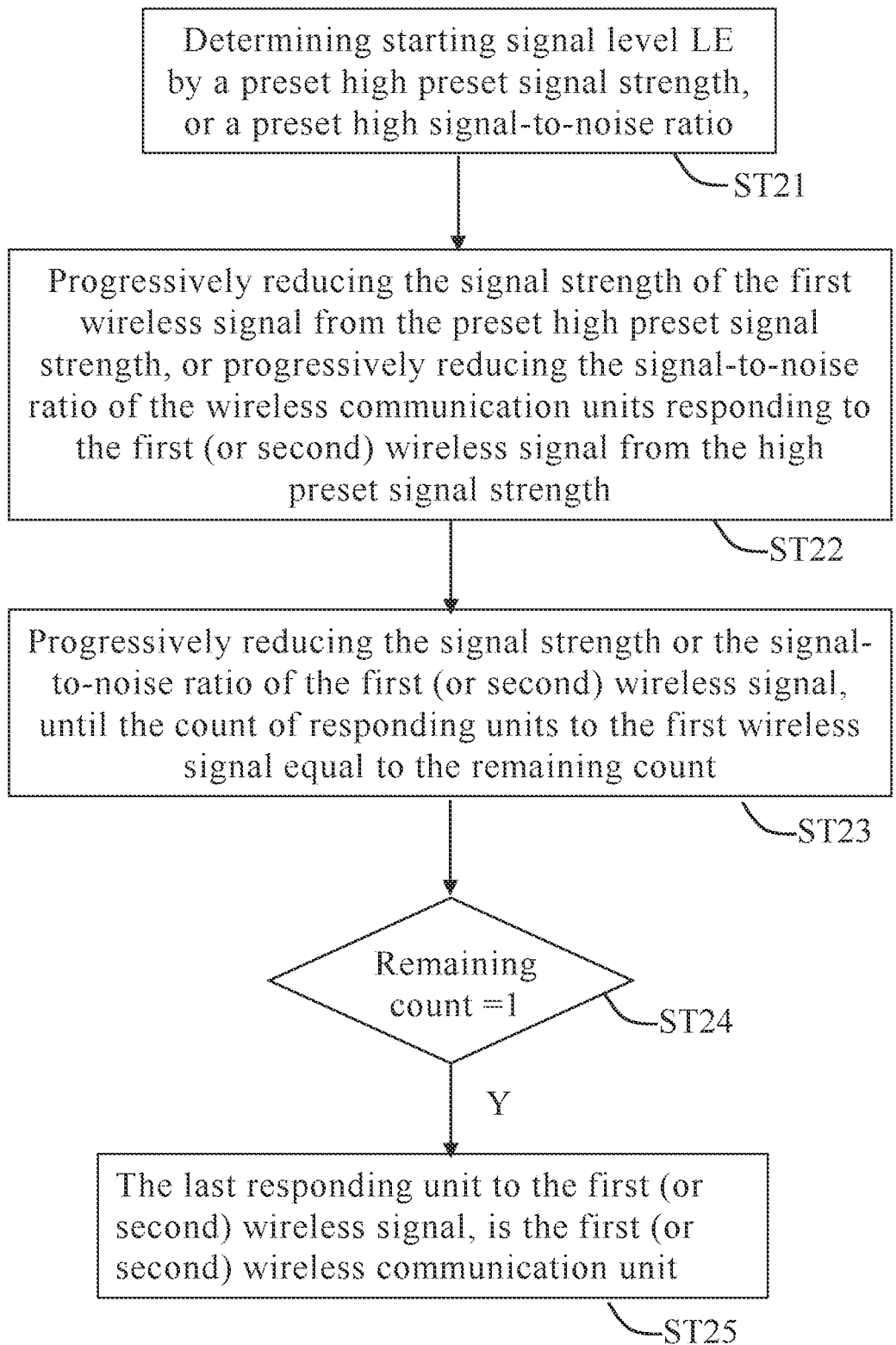
FIG. 6 illustrates a flow diagram of a signal level adjustment scenario according to one embodiment of the present invention.

As shown in FIG. 6, in one embodiment, the wireless communication identification method can further include: determining the starting signal level LE by a high preset signal strength, or a high preset signal-to-noise ratio (ST21); the signal level adjustment scenario SCE including: progressively reducing the signal strength of the first wireless signal S1 initially from the high preset signal strength, or progressively reducing the signal-to-noise ratio of the remaining wireless communication units CUR responding to the first wireless signal S1 initially from the high preset signal strength (ST22); progressively reducing the signal strength or the signal-to-noise ratio of the first wireless signal S1, until the count of responding units CUF to the first wireless signal S1 in the remaining wireless communication units CUR is progressively reduced to be the first remaining count (ST23); and when the first remaining count is equal to one (ST24), the last responding unit to the first wireless signal S1, is the first wireless communication unit CU1 (ST25).

Figure 7:
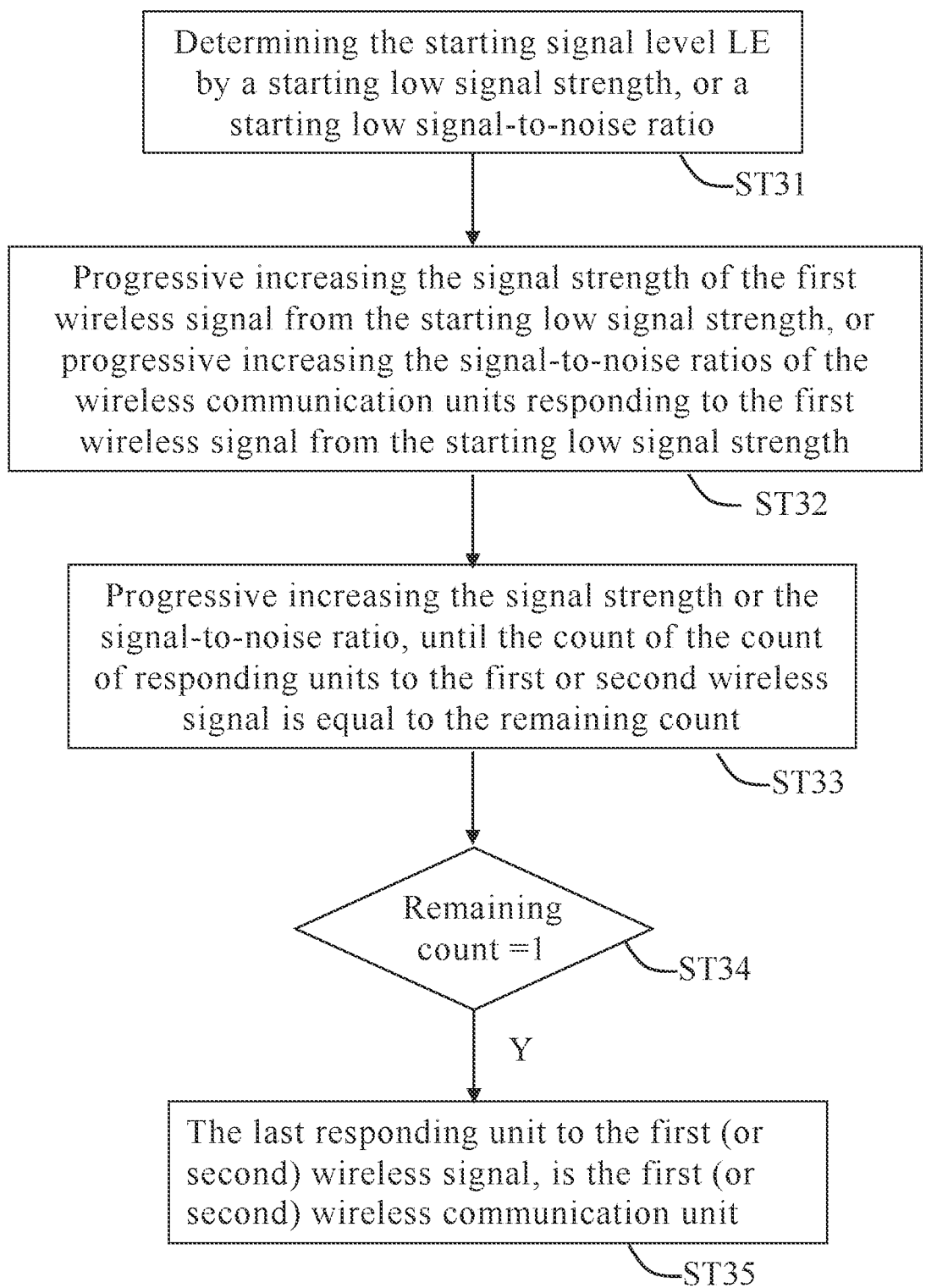
FIG. 7 illustrates a flow diagram of a signal level adjustment scenario according to one embodiment of the present invention.

As shown FIG. 7, in one embodiment, the wireless communication identification method further includes: determining the starting signal level LE by a starting low signal strength, or a starting low signal strength (ST31); the signal level adjustment scenario SCE including: progressive increasing the signal strength of the first wireless signal S1 initially from the starting low signal strength, or progressive increasing the signal-to-noise ratios of the remaining wireless communication units CUR for the first wireless signal S1 initially from the starting low signal strength (ST32); progressive increasing the signal strength or the signal-to-noise ratio, until the count of the count of responding units CUF to the first wireless signal S1 in the remaining wireless communication units CUR is to be the first remaining count (ST33); and when the first remaining count is equal to one (ST34), the last responding unit CUF to the first wireless signal S1 is the first wireless communication unit CU1 (ST35).

In one embodiment, the wireless communication identification method further includes: the first wireless communication unit CU1 sending a second wireless signal S2 according to a starting signal level LE, and progressively limiting a count of the remaining wireless communication units CUR responding to the second wireless signal S2 except the first wireless communication unit CU1, to be a second remaining count, according to a signal level adjustment scenario SCE. The signal level adjustment scenario SCE further includes: a second wireless communication unit CU2, being the last response unit CUF to the second wireless signal S2 according to the signal level adjustment scenario SCE.

In one embodiment, the first wireless signal connection RC1 and the second wireless signal connection RC2 form a wireless daisy chain connection.

From FIG. 1A to FIG. 1C, according to a perspective, the invention provides a battery wireless management system including: a master device DM, including a master wireless communication unit CUM; and a plurality of slave devices (e.g., a slave device DD1 in FIG. 1C, a slave device DD2 in FIG. 3B), including a plurality of battery units (not shown) and a plurality of wireless communication units (e.g., wireless communication unit CU1 in FIG. 1C, wireless communication unit CU2 in FIG. 3B) respectively. The master wireless communication unit CUM sends a first wireless signal initially from a starting signal level LE, and progressively limits a count of the remaining wireless communication units CUR responding to the first wireless signal S1 according to a signal level adjustment scenario SCE; a first wireless communication unit CU1, determined by categorizing (in a categorizing step CL) the responding units to the first wireless signal S1 in the remaining wireless communication units CUR according to the signal level adjustment scenario SCE. The first wireless communication unit CU1 is disposed in a first slave device DD1. The first wireless signal connection RC1 is established between the master wireless communication unit CUM and the first wireless communication unit CU1 by the first wireless signal S1. The battery wireless management system transmits the first unit identity information ID1 of the first wireless communication unit CU1 in the first wireless signal connection RC1.

In one embodiment, the first wireless communication unit CU1 transmits a second wireless signal S2 initially from the starting signal level LE, and progressively limits the count of the remaining wireless communication units CUR responding to the second wireless signal S2 except the first wireless communication unit CU1 according to the signal level adjustment scenario SCE. A second wireless communication unit CU2 is the last responding unit CUF to the second wireless signal S2. The second wireless communication unit CU2 is disposed in a second slave device DD2. Therein, the description and explanation of the components of the wireless communication identification method are described in the aforementioned embodiments of the wireless communication identification system and will not be repeated herein.

The present invention has been described in considerable detail with reference to certain preferred embodiments thereof. It should be understood that the description is for illustrative purpose, not for limiting the scope of the present invention. Those skilled in this art can readily conceive variations and modifications without departing from the spirit of the present invention.

What is claimed is:

1. A wireless communication identification system, for providing signal communication in a battery management system, the battery management system including a plurality of battery units wired to each other, the wireless communication identification system including:
a master wireless communication unit, sending a first wireless signal initially from a starting signal level, and progressively limiting a count of remaining wireless communication units responding to the first wireless signal in the wireless communication identification system, according to a signal level adjustment scenario, wherein the battery units are connected to the remaining wireless communication units in a one-to-one manner; and
a first wireless communication unit, being the last responding unit to the first wireless signal by categorizing the remaining wireless communication units according to the signal level adjustment scenario;
wherein a first wireless signal connection is established between the master wireless communication unit and the first wireless communication unit by the first wireless signal, and the wireless communication identification system transmits first unit identity information of the first wireless communication unit via the first wireless signal connection.

2. The wireless communication identification system of claim 1, wherein the categorizing step includes: determining the last one of the remaining wireless communication units to respond to the first wireless signal, to be the first wireless communication unit; or determining the first wireless communication unit based on signal level rankings of the remaining wireless communication units responding to the first wireless signal.

3. The wireless communication identification system of claim 1, wherein the starting signal level is a high preset signal strength, and the signal level adjustment scenario includes: progressively reducing the signal strength of the first wireless signal initially from the high preset signal strength; or, the starting signal level is a high preset signal-to-noise ratio, and the signal level adjustment scenario includes: progressively reducing signal-to-noise ratios of the responding units in the remaining wireless communication units initially from the high preset signal-to-noise ratio to respond to the first wireless signal; wherein the signal strength of the first wireless signal or the signal-to-noise ratio for responding to the first wireless signal, is progressively reduced until a first remaining count of the responding units to the first wireless signal is equal to one, and the last responding unit to the first wireless signal is determined to be the first wireless communication unit.

4. The wireless communication identification system of claim 3, wherein when the signal strength of the first wireless signal is progressively reduced to a first minimum responding strength and the first remaining count is larger than one, the signal-to-noise ratios of the responding units for responding to the first wireless signal are progressively reduced, for reducing a count of the responding units to be one, wherein the last responding unit to the first wireless signal is determined to be the first wireless signal; or, when the signal-to-noise ratios of the responding units to the first wireless signal are progressively reduced to a minimum signal-to-noise ratio and the first remaining count is larger than one, the master wireless communication unit progressively reduces the signal strength of the first wireless signal, for reducing the count of the responding unit to be equal to one, wherein the last responding unit to the first wireless signal is determined to be the first communication unit.

5. The wireless communication identification system of claim 3, wherein the signal level adjustment scenario includes: progressively reducing the signal strength of the first wireless signal to a first minimum responding strength, or the signal-to-noise ratios of the responding units to respond the first wireless signal are progressively reduced to a first minimum signal-to-noise ratio, wherein the first remaining count is larger than one, and the wireless communication identification system generates a responding identification information group for respectively identifying the responding units, and the responding units includes the first wireless communication unit, and wherein in the remaining wireless communication units, the first wireless communication unit includes a maximum received signal strength of the first wireless signal, or a maximum signal-to-noise ratio for responding to the first wireless signal.

6. The wireless communication identification system of claim 1, wherein the starting signal level is the starting low signal strength, and the signal level adjustment scenario includes: progressively increasing the signal strength of the first wireless signal initially from the starting low signal strength; or, the starting signal level is a starting low signal-to-noise ratio, and the signal level adjustment scenario including: progressively increasing the signal-to-noise ratios of the remaining wireless communication units initially from the starting signal level for responding to the first wireless signal; wherein the signal strength or the signal-to-noise ratio, is progressively reduced until a count of the responding units to the first wireless signal is to be a first remaining count; and wherein when the first remaining count is equal to one, the last responding unit to the first wireless signal is determined to be the first wireless communication unit.

7. The wireless communication identification system of claim 6, wherein when the starting signal level is a starting low signal strength and the first remaining count is larger than one, the signal-to-noise ratios of the responding units for the first wireless signal are progressively reduced until the first remaining count is equal to one, and the last responding unit to the first wireless signal is determined to be the first wireless communication unit; or, when the starting signal level is the starting low signal-to-noise ratio, and the first remaining count is larger than one, the master wireless communication unit progressively reduces the signal strength of the first wireless signal to reduce the count of the responding units until the first wireless signal is equal to one, wherein the last responding unit to the first wireless signal is determined to be the first wireless communication unit.

8. The wireless communication identification system of claim 1, wherein the first wireless communication unit sends a second wireless signal initially from the starting signal level and progressively limits a count of the remaining wireless communication units responding to the second wireless signal according to the signal level adjustment scenario, to a second remaining count, wherein the remaining wireless communication units do not include the first wireless communication unit, and the last responding unit to the second wireless signal is determined to be the second wireless communication unit.

9. The wireless communication identification system of claim 8, wherein the starting signal level is a high preset signal strength, and the signal level adjustment scenario includes: progressively reducing the signal strength of the second wireless signal initially from the high preset signal strength; or, the starting signal level is a high preset signal-to-noise ratio and the signal level adjustment scenario includes: progressively reducing the signal-to-noise ratios of the responding units for responding to the second wireless signal initially from the high preset signal strength; wherein the signal-to-noise ratios or the signal strength for responding to the second wireless signal, is progressively reduced until the second remaining count is equal to one, wherein the last responding unit to the second wireless signal is determined to be the second wireless communication unit.

10. The wireless communication identification system of claim 8, wherein the starting signal level is a starting low signal strength, and the signal level adjustment scenario includes: progressively increasing the signal strength of the second wireless signal initially from the starting low signal strength; or, the starting signal level is a starting low signal-to-noise ratio, and the signal level adjustment scenario includes: progressively increasing the signal-to-noise ratios of the remaining wireless communication units except the first wireless communication unit, to responding to the second wireless signal initially from the starting low signal-to-noise ratio, wherein the signal-to-noise ratios or the signal strength for the second wireless signal, is progressively increasing until a count of the responding units is to be the second remaining count, wherein the last responding unit to the second wireless signal, is determined to be the second wireless communication unit.

11. The wireless communication identification system of claim 8, wherein after the second wireless communication unit responding to the second wireless signal, a second wireless signal connection is established between the first wireless communication unit and the second wireless communication unit, and the wireless communication identification system transmits the second unit identity information of the second wireless communication unit via the second wireless signal connection.

12. The wireless communication identification system of claim 11, wherein the master wireless communication unit and the first wireless communication unit are connected via the first wireless signal connection, and the first wireless communication unit and the second wireless communication unit are connected via the second wireless signal connection, wherein the first and second wireless signal connections form a wireless daisy chain, and the information between the master wireless communication unit, the first wireless communication unit, and the second wireless communication unit are transmitted by the wireless daisy chain.

13. The wireless communication identification system of claim 12, wherein the wireless communication identification system sends a wireless time calibration signal via the wireless daisy chain, and the wireless communication units connected to the wireless daisy chain, synchronously calibrate their internal circuit times based on the wireless time calibration signal, wherein the wireless time calibration signal has a calibration period, which is determined according to the sampling frequencies or the accumulated clock deviation in the internal circuits of the wireless communication units.

14. The wireless communication identification system of claim 8, wherein a distance between the first wireless communication unit and the master wireless communication unit, is shorter than a distance between the second wireless communication unit and the master wireless communication unit.

15. A wireless communication identification method, for identify a plurality of wireless communication units in a battery management system, the battery management system including a plurality of battery units wired to each other, the wireless communication identification method including:
determining a master wireless communication unit among the wireless communication units, the master wireless communication unit sending a first wireless signal initially from a starting signal level, and progressively limiting a count of the remaining wireless communication units responding to the first wireless signal in the wireless communication identification system according to a signal level adjustment scenario;
determining a first wireless communication unit, the first wireless communication unit being the last responding unit of the remaining wireless communication units to the first wireless signal by categorizing the remaining wireless communication units according to the signal level adjustment scenario, wherein the battery units are connected to the remaining wireless communication units in a one-to-one manner; and
after the first wireless communication unit responding to the first wireless signal, establishing a first wireless signal connection between the master wireless communication unit and the first wireless communication unit, and the wireless communication identification system transmitting first unit identity information of the first wireless communication unit via the second wireless signal.

16. The wireless communication identification method of claim 15, wherein the starting signal level is a high preset signal strength, and the signal level adjustment scenario includes: progressively reducing the signal strength of the second wireless signal initially from the high preset signal strength; or, the starting signal level is a high preset signal-to-noise ratio and the signal level adjustment scenario includes: progressively reducing the signal-to-noise ratios of the responding units to respond the second wireless signal initially from the high preset signal-to-noise ratio; wherein the signal-to-noise ratios or the signal strength for the second wireless signal, is progressively reduced until the second remaining count is equal to one, wherein the last remaining unit responding to the second wireless signal is determined to be the second wireless communication unit.

17. The wireless communication identification method of claim 15, wherein the starting signal level is a starting low signal strength, and the signal level adjustment scenario includes: progressively increasing the signal strength of the second wireless signal initially from the starting low signal strength; or, the starting signal level is a starting low signal-to-noise ratio, and the signal level adjustment scenario includes: progressively increasing the signal-to-noise ratios of the remaining wireless communication units except the first wireless communication unit, to respond the second wireless signal initially from the starting low signal-to-noise ratio, wherein the signal-to-noise ratios or the signal strength for responding to the second wireless signal, is progressively increasing, until a count of the responding units is to be the second remaining count, wherein the last responding unit to the second wireless signal, is determined to be the second wireless communication unit.

18. A battery wireless management system, including:
a master device including a master wireless communication unit;
a plurality of slave devices, respectively including a plurality of battery units and a plurality of slave wireless communication units, wherein, wherein the plurality of battery units are connected to the slave wireless communication units in a one-to-one manner, and a master wireless communication unit sends a first wireless signal initially from a starting signal level and progressively limits a count of the slave wireless communication units responding to the first wireless signal according to a signal level adjustment scenario; and
a first wireless communication unit, being the last responding unit to the first wireless signal by categorizing the slave wireless communication units according to the signal level adjustment scenario, wherein the slave device disposing the first wireless communication unit is determined to be a first slave device;
wherein a first wireless signal connection is established between the master wireless communication unit and the first wireless communication unit via the first wireless signal, and the battery wireless management system transmits first unit identity information of the first wireless communication unit via the first wireless signal connection.

19. The battery wireless management system of claim 18, wherein the categorizing step including: the first wireless communication unit being the last one of the remaining wireless communication units responding to the first wireless signal; or, the first wireless communication unit is determined based on signal level rankings of the remaining wireless communication units responding to the first wireless signal.

20. The battery wireless management system of claim 18, wherein the first wireless communication unit sends a second wireless signal initially from the starting signal level, and progressively limits a count of the remaining wireless communication units responding to the second wireless signal according to the signal level adjustment scenario, wherein the remaining wireless communication units do not include the first wireless communication unit, the last responding unit to the second wireless signal is determined to be the second wireless communication unit, and the slave device disposing the second wireless communication unit is determined to be a second slave device.

\* \* \* \* \*